United States Patent
Cheng

(10) Patent No.: US 10,133,124 B2
(45) Date of Patent: Nov. 20, 2018

(54) LIQUID CRYSTAL DISPLAY DEVICE AND ARRAY SUBSTRATE

(71) Applicant: Wuhan China Star Optoelectronics Technology Co., Ltd., Wuhan, Hubei (CN)

(72) Inventor: Wei Cheng, Hubei (CN)

(73) Assignee: WUHAN CHINA STAR OPTOELECTRONICS TECHNOLOGY CO., LTD. (CN)

(*) Notice: Subject to any disclaimer, the term of this patent is extended or adjusted under 35 U.S.C. 154(b) by 0 days.

(21) Appl. No.: 14/778,158

(22) PCT Filed: May 20, 2015

(86) PCT No.: PCT/CN2015/079361
§ 371 (c)(1),
(2) Date: Nov. 23, 2016

(87) PCT Pub. No.: WO2016/173010
PCT Pub. Date: Nov. 3, 2016

(65) Prior Publication Data
US 2017/0102566 A1   Apr. 13, 2017

(30) Foreign Application Priority Data
Apr. 30, 2015   (CN) .......................... 2015 1 0219624

(51) Int. Cl.
*G02F 1/01*   (2006.01)
*G02F 1/1339*   (2006.01)
(Continued)

(52) U.S. Cl.
CPC .......... *G02F 1/1339* (2013.01); *G02F 1/0107* (2013.01); *G02F 1/161* (2013.01);
(Continued)

(58) Field of Classification Search
CPC ....... G02F 1/0107; G02F 1/1339; G02F 1/161
See application file for complete search history.

(56) References Cited

U.S. PATENT DOCUMENTS

2012/0171425 A1* 7/2012 Tseng .................... G02F 1/1339
428/156
2012/0229743 A1* 9/2012 Sasaki ................... G02F 1/1339
349/123
(Continued)

FOREIGN PATENT DOCUMENTS

CN    101089689    12/2007
CN    102262319    11/2011
(Continued)

OTHER PUBLICATIONS

Search Report and Written Opinion, dated Jan. 20, 2016, for International Application No. PCT/CN2015/079361.
(Continued)

*Primary Examiner* — Nathanael R Briggs
*Assistant Examiner* — Alexander Gross
(74) *Attorney, Agent, or Firm* — Kim Winston LLP

(57) ABSTRACT

The array substrate comprises a transparent substrate and a film layer which covers the transparent substrate and which is provided with a groove, wherein the film layer is further provided with protrusions which extend from sidewalls of the groove and are away from a bottom surface of the groove; and wherein the groove is used for accommodating frame adhesive. The frame adhesive is injected into a surface of a film layer along the groove, and part of the frame adhesive can flow into the groove and fill the groove. After the frame adhesive is solidified, a clamping connection can be formed between the frame adhesive in the groove and the film layer, so that the frame adhesive and the array substrate can be connected with each other more firmly.

9 Claims, 2 Drawing Sheets

(51) Int. Cl.
*G02F 1/161* (2006.01)
*G02F 1/1333* (2006.01)

(52) U.S. Cl.
CPC ............ *G02F 2001/133302* (2013.01); *G02F 2001/133388* (2013.01); *G02F 2202/28* (2013.01)

(56) References Cited

U.S. PATENT DOCUMENTS

2015/0168754 A1* 6/2015 Im .................. G02F 1/1339 349/85
2015/0286080 A1* 10/2015 Sumita .................. G02F 1/1339 349/153

FOREIGN PATENT DOCUMENTS

| | | |
|---|---|---|
| CN | 102540583 | 7/2012 |
| CN | 103454797 | 12/2013 |
| CN | 203480171 | 3/2014 |
| CN | 103941460 | 7/2014 |
| JP | 2006227142 | 8/2006 |
| JP | 2008191637 | 8/2008 |
| JP | 2013190715 | 9/2013 |

OTHER PUBLICATIONS

Office Action and Search Report, dated Mar. 27, 2017 for Chinese Patent Application No. 201510219624.7.

* cited by examiner

LIQUID CRYSTAL DISPLAY DEVICE AND ARRAY SUBSTRATE

CROSS REFERENCE TO RELATED APPLICATION

The present application claims benefit of Chinese patent application CN 201510219624.7, entitled "Liquid Crystal Display Device and Array Substrate" and filed on Apr. 30, 2015, the entirety of which is incorporated herein by reference.

FIELD OF THE INVENTION

The present disclosure relates to the technical field of liquid crystal display, and particularly to a liquid crystal display device and an array substrate.

BACKGROUND OF THE INVENTION

FIG. 1 schematically shows a structure of a liquid crystal cell of a liquid crystal display device. The liquid crystal cell comprises an array substrate, a color filter substrate, liquid crystals 10, and frame adhesive 19, wherein the array substrate and the color filter substrate are parallel to each other. The frame adhesive 19 has a rectangular frame structure, and is arranged between the array substrate and the color filter substrate. The array substrate, the color filter substrate, and the frame adhesive 19 jointly form a cell structure for accommodating the liquid crystals 10. The array substrate and the color filter substrate are adhered to each other by the frame adhesive 19, so that the liquid crystals 10 in a gap between the array substrate and the color filter substrate can be prevented from flowing out.

The array substrate comprises an array glass substrate 1 and a first film layer that is coated on the array glass substrate 1. The first film layer generally comprises a flat layer 2 that covers the array glass substrate, a silicon nitride layer 3 that covers the flat layer 2, and a first orientation film 4 that covers the silicon nitride layer 3. The color filter substrate comprises a color filter glass substrate 8 and a second film layer that is coated on the color filter glass substrate 8. The second film layer generally comprises a black matrix 7 that covers the color filter glass substrate 8, an overcoat layer 6 that covers the black matrix 7, and a second orientation film 5 that covers the overcoat layer 6.

An area of the first orientation film 4 is less than that of the silicon nitride layer 3. In this case, in the first film layer, a frame region can be formed at an outer edge of the silicon nitride layer 3 which does not overlap with the first orientation film 4. The frame adhesive 19, which is in a liquid state or a semi-fluid state before solidification, is sprayed from a nozzle and coated on a surface of the silicon nitride layer 3 along the frame region. The frame adhesive 19 generally covers edges of the first orientation film 4. Spacers 9 are distributed on the first orientation film 4, and then the color filter substrate is placed on the frame adhesive 19 and the spacers 9. The frame adhesive 19 can be solidified under irradiation of light. In general, the frame adhesive 19 is irradiated by light that is perpendicular to the array substrate from one side of the array glass substrate. In this manner, the array substrate and the color filter substrate can be adhered to each other through the frame adhesive 19.

The flat layer 2 is generally provided with driving circuits 11 in which scanning lines are integrated, and the driving circuits 11 are arranged between the frame adhesive 19 and the array glass substrate 1. With the development of narrow frame technology of display screen, the driving circuits 11 are distributed in an increasingly dense manner. As a result, the light transmittance of part of the flat layer 2 in which the driving circuits 11 are arranged drops from 45 percent to 20 percent or even lower. Consequently, the frame adhesive 19 cannot be solidified sufficiently due to the insufficient light irradiation, and thus the array substrate would be separated from the frame adhesive 19 easily.

SUMMARY OF THE INVENTION

With respect to the technical problem of unreliable connection between the array substrate and the frame adhesive, the present disclosure provides an array substrate. The array substrate comprises a transparent substrate and a film layer which covers the transparent substrate and which is provided with a groove, wherein the film layer is further provided with protrusions which extend from sidewalls of the groove and are away from a bottom surface of the groove; and wherein the groove is used for accommodating frame adhesive.

According to a specific embodiment, a cross section of each of the protrusions has a gradually decreasing thickness in an extending direction of a protrusion.

According to a specific embodiment, the cross section of each of the protrusions has a wedge shape, and an outside surface of each of the protrusions is flush with a surface of the film layer which is near to an opening of the groove.

According to a specific embodiment, a plurality of protrusions are arranged on two sides of the groove in a uniform manner.

According to a specific embodiment, the plurality of protrusions that are located at one of the sidewalls are arranged alternately in an extending direction of the groove.

According to a specific embodiment, two of the protrusions that are arranged on the two sides of the groove respectively and that are near to each other are aligned with each other.

According to a specific embodiment, a cross section of a part of the groove where the protrusion is arranged is a trapezoid with a longer one of two parallel sides being located on the bottom surface.

According to a specific embodiment, a cross section of a part of the groove where the protrusion is arranged on each of the two sides thereof is a trapezoid with a longer one of two parallel sides being located on the bottom surface.

According to a specific embodiment, a cross section of a part of the groove where no protrusion is arranged on the two sides thereof is a trapezoid with a shorter one of two parallel sides being located on the bottom surface.

According to a specific embodiment, a cross sectional area of the part of the groove where no protrusion is arranged on the two sides thereof is larger than a cross sectional area of the part of the groove where the protrusion is arranged on each of the two sides thereof.

The frame adhesive is injected into a surface of a film layer along the groove, and part of the frame adhesive can flow into the groove and fill the groove. After the frame adhesive is solidified, a clamping connection can be formed between the frame adhesive in the groove and the film layer. In this manner, a connection strength between the groove and the frame adhesive can be improved, a connection area between the frame adhesive and the film layer can be increased accordingly, and the frame adhesive and the array substrate can be connected with each other more firmly. At the same time, the risk that the adhesive flows out can be reduced. Moreover, the sealing performance between the frame adhesive and the array substrate can be improved.

BRIEF DESCRIPTION OF THE DRAWINGS

The present disclosure will be illustrated in detail hereinafter with reference to the embodiments and the drawings. In the drawings.

Figure 1:
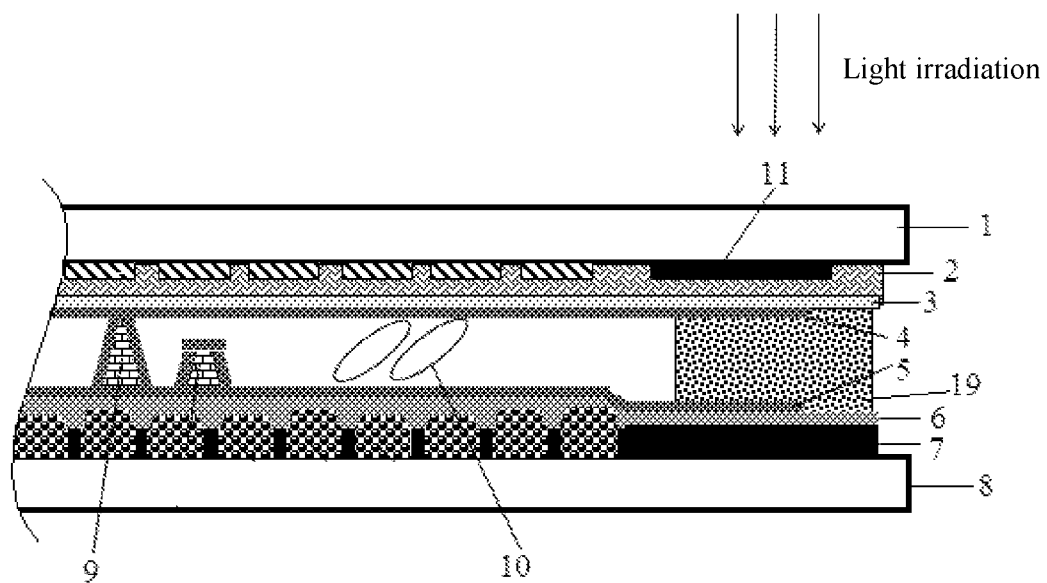
FIG. 1 is a sectional view of an edge part of a liquid crystal cell in the prior art.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

Figure 2:
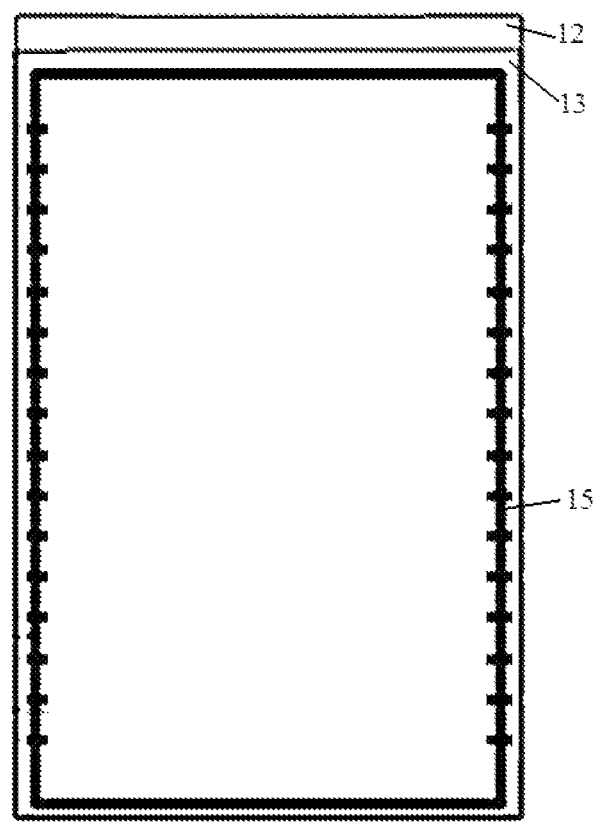
FIG. 2 schematically shows an assembling state of an array substrate and frame adhesive according to an embodiment of the present disclosure.

According to the embodiment as shown in FIG. 2, an array substrate comprises a transparent substrate 12, and a film layer 13 which covers the transparent substrate 12.

The transparent substrate 12 is generally configured to be a roughly rectangular plate structure. The transparent substrate 12 can be a transparent plate made of glass, such as aluminosilicate glass or alumina borosilicate glass. Four corners of the transparent substrate 12 are generally cut off, so that the safety thereof can be guaranteed. In general, edges of the transparent substrate 12 can be chamfered, so that the problem that the edges would be broken easily during transportation can be solved.

The film layer 13 is made of transparent materials and is coated on a surface of the transparent substrate 12. Preferably, the film layer 13 is coated on a full surface of the transparent substrate 12. The film layer 13 is provided with a groove, which has a depth direction perpendicular to a surface of the film layer 13. Preferably, the groove runs through the film layer 13. The groove which runs through the film layer 13 is easy to be processed. The groove is arranged on outer edges of the film layer 13. Preferably, the groove extends along four edges of the film layer 13, and thus forms a rectangular ring structure.

Figure 3:
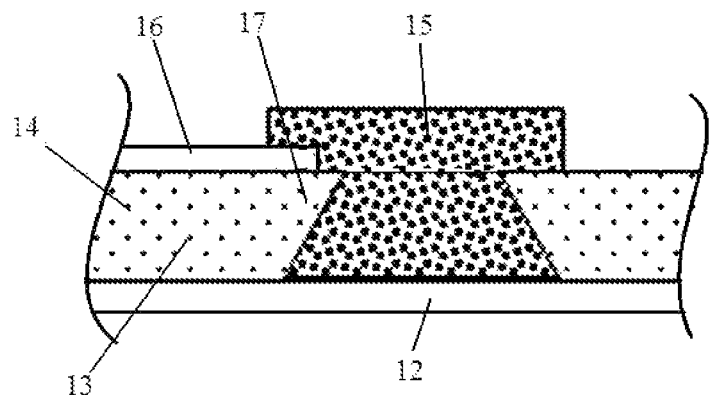
FIG. 3 is a sectional view of a part of a groove as shown in FIG. 2 where the protrusion is arranged on the two sides thereof.

As shown in FIG. 3, the film layer 13 further comprises protrusions 17. Each protrusion 17 extends from sidewalls of the groove and is away from a bottom surface of the groove. Preferably, the protrusion 17 extends in a direction parallel to the surface of the film layer 13. In this manner, a neck part of the groove with a width less than that of the bottom surface thereof can be formed at a vertex of the protrusion 17.

Frame adhesive 15 is used for adhering an array substrate and a color filter substrate with each other. The frame adhesive 15 is generally a sealing material, such as ultraviolet-curing adhesive. In general, the frame adhesive 15 can be solidified with light irradiation, and different kinds of frame adhesive 15 have different requirements for wavelengths of the light, which is well known to those skilled in the art and the details thereof are no longer repeated here. The frame adhesive 15 is in a liquid state or a semi-fluid state before solidification. The frame adhesive can be directly injected onto the surface of the film layer 13 along the groove by an injection distributor, and part of the frame adhesive can flow into the groove and fill the groove. After the frame adhesive 15 is solidified, a clamping connection can be formed between the frame adhesive 15 in the groove and the film layer 13. Specifically, a width of the frame adhesive 15 under the protrusion 17 is larger than a width of the frame adhesive 15 at the neck part of the groove, so that the frame adhesive 15 can be held in the groove by the protrusion 17. A clamping connection can be formed between the frame adhesive 15 and the film layer 13, so that a connection strength between the groove and the frame adhesive 15 can be improved. A connection area between the frame adhesive 15 and the film layer 13 is increased, and thus the connection strength between the groove and the frame adhesive 15 can be further improved. Therefore, the frame adhesive 15 and the array substrate cannot be separated from each other easily. At the same time, the sealing performance between the frame adhesive 15 and the array substrate can be improved, and the pressure resistance of a liquid crystal cell formed thereby can be strengthened.

In addition, since the groove is arranged therein, part of the frame adhesive 15 can flow into the groove before solidification. Therefore, a total accommodating amount of frame adhesive between the array substrate and the color filter substrate can be improved, and the risk that the adhesive flows out due to its excessive amount can be reduced. If the frame adhesive flows out, liquid crystals would be polluted by leaching matter of the frame adhesive 15. Consequently, a poor display effect would be resulted in. That is, the adjacent liquid crystals would be polluted by the frame adhesive 15, and speck would be generated on edges of a liquid crystal screen during display.

In particular, since the film layer 13 is provided with the groove, a thickness of the frame adhesive 15 can be increased, and thus an area of lateral projection of the frame adhesive 15 can be increased accordingly. In this case, when the frame adhesive is irradiated by light from one side of the array substrate, an area of the frame adhesive that is irradiated by the light can be increased. Therefore, the frame adhesive 15 can be irradiated and solidified by the light that is parallel to the array substrate from one side thereof. When the frame adhesive 15 is irradiated and solidified by the light from one side thereof, the solidification of the frame adhesive 15 is not affected by an arrangement of driving circuits. The driving circuits can be arranged in a more intensive manner, so that the limitations on the arrangement of the driving circuits can be reduced.

Preferably, a cross section of each of the protrusions 17 has a gradually decreasing thickness in an extending direction of a protrusion 17. The protrusion 17 forms a structure with the thickness decreasing in the extending direction thereof, and one end of the protrusion 17 with a large thickness should bear a higher bending moment. With this structure, the bending moment resistance of one end of the protrusion 17 with a large thickness is higher than that of the other end of the protrusion 17 with a small thickness. This structure of the protrusion 17 is more reasonable.

More preferably, the cross section of each of the protrusions 17 has a wedge shape, and an outside surface of each of the protrusions 17 is flush with a surface of the film layer 13 which is near to an opening of the groove. The structure of the protrusion 17 with the wedge shape cross section is simple and can be etched easily. In addition, the groove has a large depth in a part far from the protrusion 17. The frame adhesive 15 under the protrusion 17 can form a wedge shape structure, and thus the bending moment resistance of the frame adhesive 15 under the protrusion 17 with a large thickness is higher than that of the frame adhesive 15 with a small thickness. The frame adhesive 15 under the protrusion 17 with a large thickness should bear a higher bending moment, and thus this structure of the frame adhesive 15 is more reasonable. Meanwhile, the structural strength of the frame adhesive 15 and the protrusion 17 can be improved.

Preferably, a plurality of protrusions 17 are arranged on two sides of the groove in a uniform manner. In this case, the interaction force between the frame adhesive 15 and the film layer 13 distributes along the groove in a uniform manner, and thus the interaction force therebetween is more reasonable.

More preferably, two of the protrusions 17 that are arranged on the two sides of the groove respectively and that are near to each other are aligned with each other. In this case, the frame adhesive 15 can be held by the two protrusions 17 that are aligned with each other from the two sides of the groove, so that the frame adhesive 15 cannot be separated from the groove easily and the frame adhesive 15 as well as the film layer 13 can be connected with each other more closely. When the frame adhesive 15 is injected into the groove, the bubbles in a part of the groove where the protrusion 17 is arranged on the two sides thereof can be discharged from a part of the groove where no protrusion 17 is arranged on the two sides thereof. As a result, there are less bubbles in the frame adhesive 15 formed therein after solidification.

More preferably, a cross section of a part of the groove where the protrusion 17 is arranged on the two sides thereof is a trapezoid with a longer one of two parallel sides being located on the bottom surface of the groove. In this case, when the frame adhesive 15 is injected into the groove, the part of the groove where the protrusion 17 is arranged on the two sides thereof would facilitate the discharging of the bubbles. At the same time, the frame adhesive 15 under the protrusion 17 has a same structural strength as the protrusion 17, and the connection reliability between the frame adhesive 15 and the film layer 13 can be improved.

Figure 4:
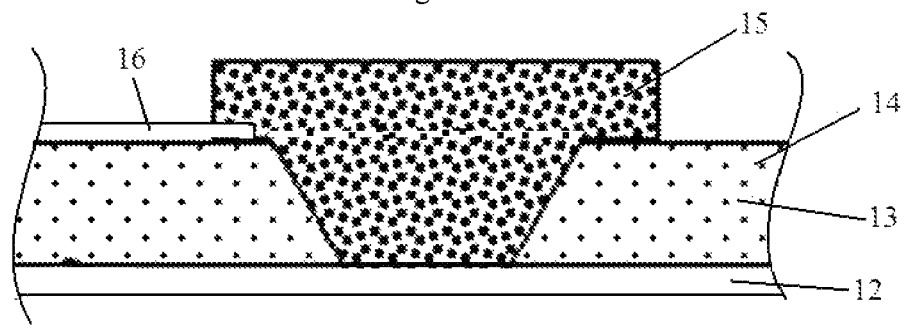
FIG. 4 is a sectional view of a part of a groove as shown in FIG. 2 where no protrusion is arranged on the two sides thereof.
Figure 5:
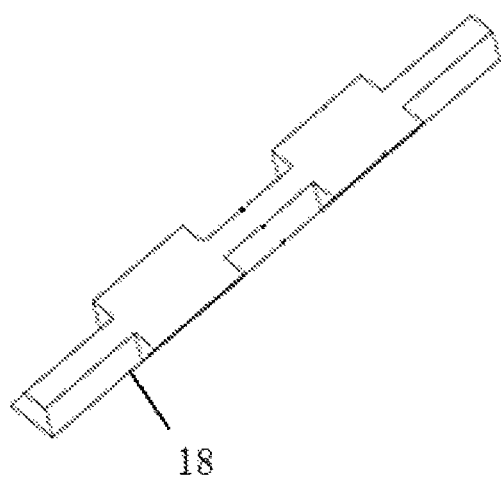
FIG. 5 is a three dimensional diagram of part of the frame adhesive in the groove as shown in FIG. 2.

More preferably, a cross section of a part of the groove where no protrusion 17 is arranged on the two sides thereof is a trapezoid with a shorter one of two parallel sides being located on the bottom surface of the groove, as shown in FIG. 4. In this case, the bubbles can be discharged from the part of the groove where no protrusion 17 is arranged on the two sides thereof more easily. Moreover, the width of the frame adhesive 15 in the part of the groove where no protrusion 17 is arranged on the two sides thereof can be increased, and thus the strength of the frame adhesive 15 can be improved. More preferably, a cross sectional area of the part of the groove where no protrusion 17 is arranged on the two sides thereof is larger than a cross sectional area of the part of the groove where the protrusion 17 is arranged on the two sides thereof. In this case, the bubbles can be discharged from the part of the groove where no protrusion 17 is arranged on the two sides thereof more easily. In this manner, a part 18 as shown in FIG. 5, i.e., a part of the frame adhesive 15 in the groove, can be formed.

The film layer 13 comprises a flat layer 14 that covers the transparent substrate 12. The flat layer 14 is preferably made of a transparent organic photoresist material. The flat layer 14 can be made of resin material. The groove can be formed by a depression in a surface of the flat layer 14 away from the transparent substrate 12, or a gap which runs through the flat layer 14 in a direction perpendicular to the flat layer 14.

The film layer 13 can further comprise a silicon nitride layer (not shown in FIG. 3 or FIG. 4) that covers the flat layer 14. The silicon nitride layer is extremely thin. The silicon nitride film can be arranged along an inner wall of the groove. The silicon nitride film is arranged between the frame adhesive 15 and the flat layer 14.

The film layer 13 generally further comprises an orientation film 16, which enables liquid crystal molecules to be oriented in a certain direction. The orientation film 16 can be made of polyimide resin, and have a thickness generally ranging from 10 mm to 100 mm. A solution of a material of the orientation film 16 is coated on the silicon nitride layer uniformly, and then baked so as to form a layered structure in a solid state. The surface of the layered structure is rubbed by a rubber in a same direction, so that a plurality of channels with a same extending direction can be formed on the surface. The orientation of the liquid crystal molecules would be affected by the channels. The orientation film 16 covers the silicon nitride layer, and an area of the orientation film 16 is less than that of the silicon nitride layer. An outer edge of the orientation film 16 generally overlaps with an inner side of the frame adhesive 15. The frame adhesive 15 cannot be adhered to the orientation film 16 firmly. When the groove is arranged, an overlapped region of the frame adhesive 15 and the orientation film 16 can be reduced. Therefore, a connection area between the frame adhesive 15 and the silicon nitride layer can be increased, and the frame adhesive 15 can be connected with the film layer 13 more firmly.

The embodiment of the present disclosure further provides a liquid crystal display device, which comprises the aforesaid array substrate.

With respect to the specific structure of the liquid crystal display device, reference can be made to the array substrate as aforementioned.

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. An array substrate, comprising a transparent substrate, and a film
    layer which covers the transparent substrate and which is provided with a groove,
    wherein the film layer is further provided with protrusions which extend from sidewalls of the groove and are away from a bottom surface of the groove;
    wherein a cross section of a part of the groove where no protrusion is arranged on two sides thereof is a trapezoid with a shorter one of two parallel sides being located on the bottom surface;
    wherein a plurality of protrusions are arranged on two sides of the groove in a uniform manner;
    wherein the plurality of protrusions that are located at one of the sidewalls are arranged alternately in an extending direction of the groove;

wherein two of the protrusions that are arranged on the two sides of the groove respectively and that are near to each other are aligned with each other;

wherein a cross section of a part of the groove where the protrusion is arranged on each of the two sides thereof is a trapezoid with a longer one of two parallel sides being located on the bottom surface; and wherein the groove is used for accommodating frame adhesive.

2. The array substrate according to claim 1, wherein a cross section of each of the protrusions has a gradually decreasing thickness in an extending direction of a protrusion.

3. The array substrate according to claim 2, wherein the cross section of each of the protrusions has a wedge shape, and an outside surface of each of the protrusions is flush with a surface of the film layer which is near to an opening of the groove.

4. The array substrate according to claim 2, wherein a plurality of protrusions are arranged on two sides of the groove in a uniform manner.

5. The array substrate according to claim 4, wherein the plurality of protrusions that are located at one of the sidewalls are arranged alternately in an extending direction of the groove.

6. The array substrate according to claim 5, wherein two of the protrusions that are arranged on the two sides of the groove respectively and that are near to each other are aligned with each other.

7. The array substrate according to claim 1, wherein a cross sectional area of the part of the groove where no protrusion is arranged on the two sides thereof is larger than a cross sectional area of the part of the groove where the protrusion is arranged on each of the two sides thereof.

8. A liquid crystal display device, comprising:

an array substrate, which comprises a transparent substrate and a film layer which covers the transparent substrate and which is provided with a groove, wherein the film layer is further provided with protrusions which extend from sidewalls of the groove and are away from a bottom surface of the groove;

wherein a cross section of a part of the groove where no protrusion is arranged on two sides thereof is a trapezoid with a shorter one of two parallel sides being located on the bottom surface;

wherein a plurality of protrusions are arranged on two sides of the groove in a uniform manner;

wherein the plurality of protrusions that are located at one of the sidewalls are arranged alternately in an extending direction of the groove;

wherein two of the protrusions that are arranged on the two sides of the groove respectively and that are near to each other are aligned with each other;

wherein a cross section of a part of the groove where the protrusion is arranged on each of the two sides thereof is a trapezoid with a longer one of two parallel sides being located on the bottom surface;

wherein the groove is used for accommodating frame adhesive; and frame adhesive that is filled in the groove.

9. A liquid crystal display device, comprising:

an array substrate, which comprises a transparent substrate and a film layer which covers the transparent substrate and which is provided with a groove, wherein the film layer is further provided with protrusions which extend from sidewalls of the groove and are away from a bottom surface of the groove;

wherein a cross section of a part of the groove where no protrusion is arranged on two sides thereof is a trapezoid with a shorter one of two parallel sides being located on the bottom surface;

wherein a plurality of protrusions are arranged on two sides of the groove in a uniform manner;

wherein the plurality of protrusions that are located at one of the sidewalls are arranged alternately in an extending direction of the groove;

wherein two of the protrusions that are arranged on the two sides of the groove respectively and that are near to each other are aligned with each other;

wherein a cross section of a part of the groove where the protrusion is arranged on each of the two sides thereof is a trapezoid with a longer one of two parallel sides being located on the bottom surface;

wherein the groove is used for accommodating frame adhesive;

wherein a cross section of each of the protrusions has a gradually decreasing thickness in an extending direction of a protrusion; and frame adhesive that is filled in the groove.

* * * * *